Patented Nov. 2, 1937

2,097,493

UNITED STATES PATENT OFFICE 2,097,493

PREPARATION OF POLYHYDROXY COMPOUNDS FROM FURAN COMPOUNDS

Gerald J. Leuck, Evanston, Joseph Pokorny, Chicago, and Fredus N. Peters, Jr., Evanston, Ill., assignors to The Quaker Oats Company, Chicago, Ill., a corporation of New Jersey No Drawing. Application February 12, 1934, Serial No. 710,888

22 Claims. (Cl. 260—156.5)

This invention relates to the preparation of polyhydroxy-compounds from furan compounds and has for one of its objects the production of trihydroxy-compounds from furan derivatives.

Specific embodiments of this invention are the production of 1,2,5-(1,4,5-) pentane triol and 1,4-pentane diol from furfural or furfuryl alcohol and are illustrated by the following equations:

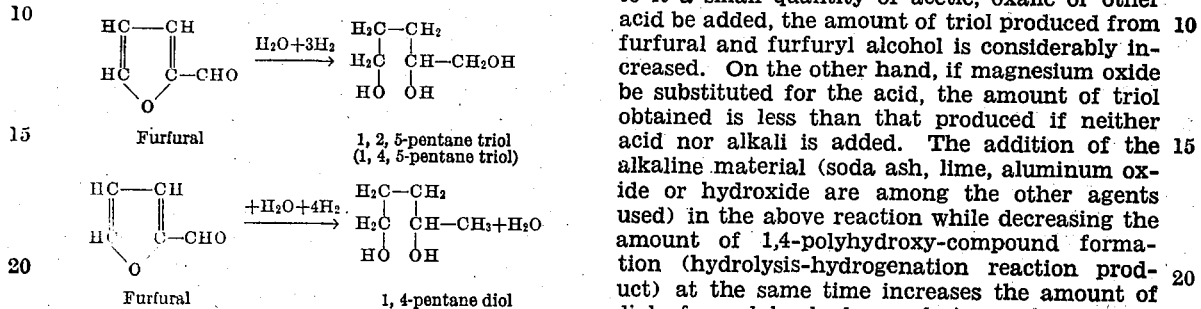

In accordance with this invention, a furan compound is subjected to the action of both hydrolizing and hydrogenating agents. For the hydrolizing agent, water is satisfactory but hydroxyl-compounds, such as methyl, ethyl, or butyl alcohols have been used. Also furfuryl alcohol or pentane triol serve the same purpose. Hereafter, in referring to the group of hydrolizing agents, including water and alcohols, we shall refer to them as hydroxylated solvents. It may be suggested that where organic hydroxyl-compounds, such as alcohol, glycerol, etc., are used, the reaction is not one of hydrolysis but is an alcoholysis. This exact nomenclature is immaterial, as far as the objects of this invention are concerned, it being only required that some compound be present which will bring about the addition of the extra hydroxyl group that becomes attached to either the 1 carbon or 4 carbon atom of the furan nucleus. The other hydroxyl group which is attached to the 4 (or 1) carbon obviously is derived from the nuclear furan oxygen. Such additional hydroxyl groups as may appear in the final product are derived from aldehyde, carbinol, ketone, or ether groups originally present in the side chain. In case no such oxygen function is present a final product of this process is a 1,4-diol.

Previous methods of hydrogenating furfural have given quantities of 1,2 and 1,5-pentane diols but no such process that has been successful has heretofore been described in which either 1,4-diols or triols were detected.

The type of hydrogenation catalyst, the pressure of hydrogen, and the temperature of reaction all affect the amount of triol produced, as does also the nature of the hydrolizing agent. We have found that the extent of the reaction can also be greatly changed by varying the acidity or alkalinity of the reaction mixture. If water be used as the hydroxylated solvent, and to it a small quantity of acetic, oxalic or other acid be added, the amount of triol produced from furfural and furfuryl alcohol is considerably increased. On the other hand, if magnesium oxide be substituted for the acid, the amount of triol obtained is less than that produced if neither acid nor alkali is added. The addition of the alkaline material (soda ash, lime, aluminum oxide or hydroxide are among the other agents used) in the above reaction while decreasing the amount of 1,4-polyhydroxy-compound formation (hydrolysis-hydrogenation reaction product) at the same time increases the amount of diols formed by hydrogenolysis reactions, i. e., 1,2- and 1,5-pentane diols.

In practicing this invention, the following general rules should be followed in producing 1,4-polyhydroxy-compounds from furfural or furfuryl alcohol. The furan compounds should be hydrogenated in the presence of a hydroxylated solvent. The use of ethyl ether (a non-hydrolizing solvent) in place of a hydroxylated solvent decreases the yield of triol and increases the yield of diols. Decrease in the velocity of hydrogenation such as may result, for example, from lowering the pressure or decreasing the agitation with consequent lengthening of the total reaction period, results in increased formation of 1,4-polyhydroxy-compounds. With other factors remaining constant, acidic conditions and elevated temperatures promote the formation of 1,4-polyhydroxy-compounds. The addition of alkaline material, such as magnesium oxide, increases the amount of diols and inhibits the formation of 1,4-polyhydroxy-compounds. In general, the increase in the amount of 1,4-polyhydroxy-compounds formed results in decreased production of tetrahydrofurfuryl alcohol or analogous compounds.

Furfural has been used instead of furfuryl alcohol and, in general, the same products in the same relative order of magnitude were obtained. The yield of polyhydroxy-compounds was nearly always slightly higher with furfural than with furfuryl alcohol.

Furfural-acetone treated in accordance with our process gave a mixture of diols and 1,4,7- octane triol. Among other furan compounds treated in a similar manner were furan, methyl furan, furoic acid, its salts and esters, dimethyl furan, furoin, furil, alkyl furyl carbinols, furacrolein, furyl ketones, furacrylic acid and its salts and esters. While all of these compounds exhibited the general behavior illustrated in the examples above, it was found that the quantitative extent of the hydrolysis (alcoholysis)-hydrogenation reaction was greatest in those compounds having the following general formula:

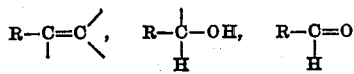

where R indicates the furyl radical.

In our invention we may use any of a number of base metal hydrogenation catalysts which can be prepared by any of the well-known methods. For example, nickel carbonate, freshly precipitated on kieselguhr and reduced in a stream of hydrogen for a period of three hours, is very satisfactory. However, for ease of duplication of results, Raney nickel catalyst (U. S. Patent No. 1,628,190) is highly satisfactory; and in the examples which follow, this type of catalyst is specified, merely for the purpose of making each of the examples comparable, thus enabling one to more easily understand the principles involved in this invention. This catalyst is prepared by treating an aluminum-nickel alloy with caustic soda. The aluminum dissolves with evolution of hydrogen and an active nickel sludge settles to the bottom of the reaction vessel. This is washed free from alkali and kept moist, or at least away from contact with air. It is handled the same as any other active nickel catalyst.

The following Example 1 is offered as a preferred mode of operating our invention for the production of polyhydroxy-compounds:

*Example 1*

100 parts by weight of furfuryl alcohol, 40 parts of water, 2 parts glacial acetic acid and 5 parts of Raney nickel catalyst were reacted at 160° C. with hydrogen at 1,000 lbs. pressure, the degree of agitation being regulated in such a manner that the hydrogen absorption had practically stopped at the expiration of 150 minutes. The catalyst was removed from the reaction product by centrifuging and filtering and the liquid material was subjected to fractional distillation at 15 mm. pressure. The fraction boiling between 77° C. and 160° C. and amounting to 40 parts was collected and consisted mainly of diols. In a similar manner, 50 parts of material was collected which boiled between 160° C. and 185° C. Analysis showed this to consist chiefly of 1,2,5-pentane triol.

In Example 1 the hydrolysis and hydrogenation reactions are carried out practically simultaneously, but it is to be understood that these reactions may occur consecutively as in Example 2.

*Example 2*

100 parts of furfuryl alcohol was refluxed for four hours at atmospheric pressure with approximately an equal quantity of water. This refluxing is for the purpose of hydrolyzing the furfuryl alcohol or, in other words, it is done to add another hydroxyl group to the carbon atoms in the furan ring. The resulting mixture was placed in an autoclave with 6 parts of said Raney nickel catalyst, or an equivalent thereof, and hydrogenated at 1,000 lbs. pressure at 160° C. until absorption of hydrogen substantially ceased. Upon separation of the catalyst, a viscous liquid of mild odor was obtained which comprised a number of polyhydroxy-compounds. Upon fractional distillation of this mixture under a vacuum, there was obtained a diol fraction of 25 parts, 15 parts of 1,2,5-pentane triol, and 45 parts of a viscous polyhydroxy-compound of high molecular weight. Dehydration experiments showed that this polyhydroxy-compound contained two of its hydroxyl groups in a 1,4-position with respect to each other. If the hydrolysis product be dried prior to hydrogenation, the yield of triol is reduced to 10 parts, the high boiling product to 35 parts, and the diol fraction is increased to 30 parts.

In both the foregoing examples, tetrahydrofurfuryl alcohol was formed in addition to diols and triols. By fractional distillation, preferably under vacuum, such as is well known in the art, any of the mixtures produced by our process may be separated into their component parts.

It will be obvious to those skilled in the art that combinations of the different factors illustrated above can be made so as to produce a great variation in the yields of products, time of reaction, etc. While we have used Raney nickel catalyst in each example, this was done to make comparison simpler. Other nickel catalysts have been used, as well as other base metal catalysts; hence, the use of such catalysts or combinations thereof falls within the scope of our invention, and we wish to be limited in the practice of our invention only by the following claims.

We claim:

1. A process of treating furan derivatives to produce 1,4-polyhydroxy-compounds by a reaction comprising breaking the furan ring in the presence of a hydrolyzing agent and maintaining the reacting material under elevated temperature and superatmospheric pressure conditions such as are favorable to hydrogenation, and then separating said compounds.

2. A process of treating furan derivatives to produce 1,4-polyhydroxy-compounds by a reaction comprising breaking the furan ring in the presence of a hydrolyzing agent and maintaining the reacting material under elevated temperature and superatmospheric pressure conditions such as are favorable to hydrogenation and in contact with an acid agent.

3. A process of treating furan derivatives to produce 1,4-polyhydroxy-compounds by a reaction comprising breaking the furan ring in the presence of a hydrolyzing agent and maintaining the reacting material under elevated temperature and superatmospheric pressure conditions such as are favorable to hydrogenation and in contact with a hydroxylated solvent and an acid agent.

4. A process of treating furan derivatives to produce 1,4-polyhydroxy-compounds by a reaction comprising breaking the furan ring in the presence of a hydrolyzing agent and maintaining the reacting material under elevated temperature and superatmospheric pressure conditions such as are favorable to hydrogenation and in contact with a water solution of an acid agent.

5. A process of treating furan derivatives to produce 1,4-polyhydroxy-compounds by a reaction comprising breaking the furan ring in the presence of a hydrolyzing agent and maintaining the reacting material under elevated temperature and superatmospheric pressure conditions such as are favorable to hydrogenation and in contact with a hydroxylated solvent, and then separating such polyhydroxy-compounds from the reacted mixture.

6. A process of treating furan derivatives to produce 1,4-polyhydroxy-compounds by a reaction comprising breaking the furan ring in the presence of a hydrolyzing agent and maintaining the reacting material under elevated temperature and superatmospheric pressure conditions such as are favorable to hydrogenation and in contact with an acid agent, and then separating such polyhydroxy-compounds from the reacted mixture.

7. A process of treating furan derivatives to produce 1,4-polyhydroxy-compounds by a reaction comprising breaking the furan ring in the presence of a hydrolyzing agent and maintaining the reacting material under elevated temperature and superatmospheric pressure conditions such as are favorable to hydrogenation and in contact with a hydroxylated solvent and an acid agent, and then separating such polyhydroxy-compounds from the reacted mixture.

8. A process of treating furan derivatives to produce 1,4-polyhydroxy-compounds by a reaction comprising breaking the furan ring in the presence of a hydrolyzing agent and maintaining the reacting material under elevated temperature and superatmospheric pressure conditions such as are favorable to hydrogenation and in contact with water, and then separating such polyhydroxy-compounds from the reacted mixture.

9. A process of treating furan derivatives to produce 1,4-polyhydroxy-compounds by a reaction comprising breaking the furan ring in the presence of a hydrolyzing agent and maintaining the reacting material under elevated temperature and superatmospheric pressure conditions such as are favorable to hydrogenation and in contact with water and an acid agent, and then separating such polyhydroxy-compounds from the reacted mixture.

10. A method of producing 1,4-polyhydroxy-compounds which comprises preparing a mixture of furfuryl alcohol, water, an acid agent, and nickel catalyst and maintaining such mixture in intimate contact with hydrogen under superatmospheric conditions of temperature and pressure until absorption of hydrogen approximates zero.

11. A method of producing 1,4-polyhydroxy-compounds which comprises refluxing furfuryl alcohol with water, separating the water insoluble organic material from the aqueous material and hydrogenating the organic product.

12. A process of producing polyhydroxy-compounds comprising reacting 100 parts furfuryl alcohol, 40 parts water, 2 parts glacial acetic acid and 5 parts of nickel catalyst for 150 minutes at a hydrogen pressure of 1,000 lbs. per square inch and at a temperature of 160° C. and separating from the reaction product fractions boiling between 77° C. and 160° C. at 15 mm. pressure and between 160° C. and 185° C. at 15 mm. pressure.

13. A process of producing 1,2,5-pentane triol comprising reacting furfural in the presence of a hydroxylated solvent and catalyst and under elevated temperature and superatmospheric pressure conditions such as are favorable to hydrogenation, and then separating the 1,2,5-pentane triol from the reaction products.

14. A process of producing 1,2,5-pentane triol comprising reacting furfuryl alcohol in the presence of a hydroxylated solvent and catalyst and under elevated temperature and superatmospheric pressure conditions such as are favorable to hydrogenation, and then separating the 1,2,5-pentane triol from the reaction products.

15. The process of treating furan compounds to form 1,4-polyhydroxy-compounds, which comprises opening the furan ring with a hydrolyzing agent, separating the hydrolyzed material, and then subjecting the hydrolyzed product to the action of hydrogen and a hydrogenating catalyst under superatmospheric conditions of temperature and pressure.

16. The process of treating a furan compound with a hydrolyzing agent, separating the hydrolyzed material, and then subjecting the resulting product to the action of hydrogen under superatmospheric pressure and temperature in the presence of a hydrogenating catalyst.

17. The process of opening the furan ring by hydrolyzing a furan compound, separating the hydrolyzed material, and stabilizing the products so formed by hydrogenating them under superatmospheric pressure and temperature in the presence of a hydrogenating catalyst.

18. A method for producing polyhydroxy-compounds which comprises refluxing furfuryl alcohol with water and an acidic agent, separating the organic material from the aqueous material, and then hydrogenating the organic material.

19. The process of producing polyhydroxy-compounds which comprises substantially simultaneously hydrogenating and hydrolyzing furfuryl alcohol in an acid reacting medium.

20. The process of producing 1,4-polyhydroxy-compounds which comprises treating a furan derivative in an acid reacting medium with hydrogen and a hydrogenation catalyst at an elevated temperature and superatmospheric pressure, and then separating from the reaction product the 1,4-polyhydroxy-compounds.

21. The process of producing 1,4-polyhydroxy-compounds which comprises hydrogenating and hydrolyzing a furan derivative, such as furfuryl alcohol, in an acid reacting medium at a temperature approximating 160° C. and under a pressure approximating 1,000 pounds per square inch, and then separating said compounds from the reacted mixture.

22. The process of producing 1,4-polyhydroxy-compounds which comprises treating a furan derivative, such a furfural or furfuryl alcohol, in an acid reacting medium with hydrogen and a hydrogenation catalyst at a temperature of 160° C. and under a pressure of 1,000 pounds per square inch, and then separating from the reacted product the 1,4-polyhydroxy-compounds.

GERALD J. LEUCK.
JOSEPH POKORNY.
FREDUS N. PETERS, Jr.